(12) United States Patent
Bernhard et al.

(10) Patent No.: US 9,533,389 B2
(45) Date of Patent: Jan. 3, 2017

(54) TOOL MAGAZINE SHELF

(71) Applicant: Maschinenfabrik Berthold Hermle AG, Gosheim (DE)

(72) Inventors: Franz-Xaver Bernhard, Spaichingen (DE); Tobias Schwörer, Königsheim (DE); Dieter Uttenweiler, Dotternhausen (DE)

(73) Assignee: Maschinenfabrik Berthold Hermle AG, Gosheim (DE)

( * ) Notice: Subject to any disclaimer, the term of this patent is extended or adjusted under 35 U.S.C. 154(b) by 437 days.

(21) Appl. No.: 14/302,168

(22) Filed: Jun. 11, 2014

(65) Prior Publication Data

US 2014/0371042 A1 Dec. 18, 2014

(30) Foreign Application Priority Data

Jun. 12, 2013 (EP) ..................................... 13003014

(51) Int. Cl.
*B23Q 3/157* (2006.01)
*B23Q 3/155* (2006.01)

(52) U.S. Cl.
CPC ......... *B23Q 3/15526* (2013.01); *B23Q 3/1554* (2013.01); *B23Q 3/15513* (2013.01);
(Continued)

(58) Field of Classification Search
CPC ............... Y10T 483/10; Y10T 483/175; Y10T 483/1752; Y10T 483/1755; Y10T 483/1767; Y10T 483/1769; Y10T 483/1771; Y10T 483/1818; Y10T 483/1827; Y10T 483/1836; B23Q 3/15515; B23Q 3/15773
(Continued)

(56) References Cited

U.S. PATENT DOCUMENTS 5,281,194 A * 1/1994 Schneider .......... B23Q 3/15526
211/1.52
6,494,821 B1 * 12/2002 Patel .................. B23Q 3/15513
483/49
(Continued)

FOREIGN PATENT DOCUMENTS

DE 4304361 A1 8/1994
DE 202011001493 U1 * 4/2011 ............. B23Q 1/015
(Continued)

OTHER PUBLICATIONS

Aug. 8, 2013, Search Report from European Patent Office in EP Application No. 13 003 014.1, which is the priority application to this U.S. application.

*Primary Examiner* — Erica E Cadugan
*Assistant Examiner* — Michael Vitale
(74) *Attorney, Agent, or Firm* — Kolisch Hartwell, P.C.

(57) ABSTRACT

An embodiment of a circular, annular tool magazine shelf of a tower construction, comprises a base frame adapted for receiving a tool shelf which has a plurality of immovable tool deposit plates, arranged in vertical succession and in a circular ring, adapted for machining one or more tools, and a power-driven tool handling system adapted for transporting tools between the tool magazine shelf and a machine-side pick-up tool magazine store. The magazine shelf also comprises a spindle tower which is mounted rotatably about a vertical rotation shaft being arranged in a circle center-point of one or more tool deposit plates, wherein the base frame includes a monolithically constructed, plate-shaped foundation in which the rotation shaft is mounted overhanging freely by way of a mounting arrangement.

18 Claims, 3 Drawing Sheets

(52) U.S. Cl.
CPC ......... *B23Q 3/15773* (2013.01); *Y10T 483/10* (2015.01); *Y10T 483/1752* (2015.01); *Y10T 483/1769* (2015.01); *Y10T 483/18* (2015.01); *Y10T 483/1827* (2015.01); *Y10T 483/1836* (2015.01); *Y10T 483/1855* (2015.01)

(58) Field of Classification Search
USPC .... 483/1, 37, 38, 39, 44, 45, 46, 60, 61, 62; 211/1.52, 96
See application file for complete search history.

(56) References Cited

U.S. PATENT DOCUMENTS

| | | | | |
|---|---|---|---|---|
| 7,153,252 B2 * | 12/2006 | Luscher | ............ | B23Q 3/15526 211/1.53 |
| 2010/0204028 A1 * | 8/2010 | Geissler | ............... | B23Q 3/1572 483/51 |

FOREIGN PATENT DOCUMENTS

| | | | | | |
|---|---|---|---|---|---|
| DE | 202011104037 U1 * | 1/2012 | | ............... | B08B 1/04 |
| EP | 0319914 A1 | 6/1989 | | | |
| EP | 1604775 B1 | 12/2005 | | | |
| EP | 1870200 B1 | 12/2007 | | | |
| EP | 2537629 A1 | 12/2012 | | | |

* cited by examiner

TOOL MAGAZINE SHELF

CROSS-REFERENCE TO RELATED APPLICATION

This application claims priority to European Patent Application No. 13003014.1, filed Jun. 12, 2013, which is hereby incorporated by reference.

BACKGROUND

The present disclosure relates to a tool magazine shelf.

SUMMARY

One or more embodiments of the present disclosure relate to a circular, annular tool magazine shelf of a tower construction, comprising a base frame for receiving a tool shelf which has a plurality of immovable tool deposit plates, arranged in vertical succession and in a circular ring, for machining tools, and receiving a power-driven tool handling system for transporting tools from the tool magazine shelf to a machine-side pick-up tool magazine store and back, and a spindle tower which is mounted rotatably about a vertical rotation shaft being arranged in the circle centre-point of the tool deposit plates.

Circular, annular tool magazine shelves of a tower construction are known in the art, for example from DE 20 2011 001 493 U1 and EP 1 604 775 B1.

One or more embodiments of the present disclosure relate to a method for automatically reloading tools in a tool magazine shelf.

A method for automatically reloading tools for a movable pick-up tool magazine store integrated on the machine side in accordance with the prior art is disclosed and depicted in DE 43 04 361 A1.

One or more embodiments of machining centres comprise integrated tool magazine stores, the tool storage capacity for machining tools being generally determined by the dimensions and space properties of the machining centre. Therefore, as a function of client applications, additional magazines are often used so as to increase the tool storage capacity. Additional magazines of this type deliver the machining tools mounted therein to the tool magazine store integrated into the machine. Additional magazines of a tower construction which contain a plurality of deposit planes arranged in vertical succession are particularly well-suited for expanding the tool storage capacity as much as possible on a small assembly area. By way of a circular, annular arrangement of the tool deposition places, all of the deposition places can be loaded and unloaded by a tool gripper using just two translational movements and one rotational movement.

Additional magazines of this type for machining tools are known in the art. Thus, for example, DE 20 2011 001 493 U1 discloses an additional magazine of this type, which expands the tool magazine store integrated into the machine with a plurality of tool deposition places. In this context, the machining tools are exchanged between the machine-side magazine and the additional magazine at defined delivery positions. The deposition places in the additional magazine, which are arranged in a circular ring, are approached using a handling system. So as to carry out the rotational movement required for this purpose, a motorised rotary drive is provided on the head of the lifting column. A drawback of this constructional configuration is that the lifting column is mounted on both sides (above and below), and this is cost-intensive.

EP 1 604 775 B1 likewise discloses and illustrates a circular, annular tool magazine shelf of a tower construction. This serves to change vertically orientated machining tools directly into the tool spindle of the machining centre by way of a changing arm, and is therefore not provided for operation in connection with a pick-up tool magazine store. The tool handling system is attached to a rotatably mounted guide, and can move vertically upwards and downwards. The rotatable mounting of this guide is located at the two ends of the guide (above and below). Accordingly, the entire support construction of this tool magazine shelf has to be manufactured to meet high precision requirements, resulting in high costs.

An object of one or more embodiments of the present disclosure is to create a tool magazine shelf as an additional magazine for a vertically orientated pick-up tool magazine store integrated into the machine, which can solve the problems and overcome the drawbacks found in the prior art.

One or more embodiments of a circular, annular tool magazine shelf of a tower construction, comprise a base frame for receiving a tool shelf which has a plurality of immovable tool deposit plates, arranged in vertical succession and in a circular ring, for machining tools, and receiving a power-driven tool handling system for transporting tools from the tool magazine shelf to a machine-side pick-up tool magazine store and back, and a spindle tower which is mounted rotatably about a vertical rotation shaft being arranged in the circle centre-point of the tool deposit plates. An object of one or more embodiments of the present disclosure may be achieved according to the present disclosure in that the base frame includes a monolithically constructed, plate-shaped foundation in which the rotation shaft is mounted overhanging freely by way of a mounting arrangement.

Within the meaning of one or more embodiments of the present disclosure, the term "tower construction" refers to a tool magazine shelf comprising more than one tool deposit plane, said planes being arranged in vertical succession so as to multiply up the deposit capacity of an individual plane. In this context, the geometry of the external housing may typically reflect the construction of a tower.

Within the meaning of one or more of the embodiments of the present disclosure, the term "vertical machining centre" refers to a machining centre in which workpieces are machined by way of the vertically orientated tool spindle.

Within the meaning of one or more of the embodiments of the present disclosure, the term "pick-up tool magazine store" refers to a tool magazine store inside the machining centre which is suitable for pick-up tool change. During what is known as pick-up tool change, the machining tools are taken directly from the pick-up tool magazine store by the vertically orientated tool spindle, without the assistance of an external tool changing device, and are deposited therein again after use.

Within the meaning of one or more of the embodiments of the present disclosure, the term "monolithically constructed foundation" refers to a foundation comprising one piece for the circular, annular tool magazine shelf.

Within the meaning of one or more of the embodiments of the present disclosure, the term "cantilever mounting" refers to the one-sided mounting of a vertically overhanging spindle tower, which connects the pedestal of the spindle tower to a foundation and makes motorised rotational movement of the spindle tower possible. The cantilever mounting is the sole connecting element between the stationary assemblies of the tool magazine shelf and of the rotatable spindle tower.

One or more of the embodiments of the present disclosure may improve the known prior art to the effect that two-sided mounting of the spindle tower is no longer necessary, and thus a support construction in which the spindle tower is additional counter-mounted on the upper side is no longer required. This makes much more cost-effective manufacture possible, since the high precision demands which would be required for two-sided mounting do not come into effect. There is further the advantage that there is no difficult-to-access counter mounting on the upper side. Because of the monolithic configuration of the base frame, the precision demands for the cantilever mounting are easy to meet, and moreover a particularly assembler-friendly construction of the system is achieved, in that the system becomes self-standing and in addition there is no assembly expense for the assembly of a plurality of individual parts of the base frame.

In one or more embodiments of the present disclosure, the mounting arrangement is in the form of a tower mounting.

In one or more embodiments of the present disclosure, the tower mounting is in the form of a one-row or two-row four-point bearing.

In one or more embodiments of the present disclosure, the four-point bearing comprises an outer ring, which is provided with external toothing and screwed to the foundation, and an inner ring, which is screwed to the spindle tower.

In one or more embodiments of the present disclosure, a drive motor comprising a drive pinion is provided for the rotary drive of the spindle tower, and is rigidly attached to the spindle tower and operatively connected to the external toothing of the outer ring, in such a way that the drive pinion rolls together with the drive motor on the stationary external toothing of the tower mounting when the spindle tower rotates.

In one or more embodiments of the present disclosure, the foundation is formed by forming all of the functional surfaces and functional spaces in one piece from polymer concrete, reaction resin concrete or the like. The functional surfaces and functional spaces thus no longer require subsequent cutting machining.

In one or more embodiments of the present disclosure, the foundation is mounted on machine feet, which are adaptable in height and are mounted in slip-proof and vibration-proof machine shoes.

In one or more embodiments of the present disclosure, the spindle tower is formed by forming all of the functional surfaces and functional spaces as a monolithically constructed single-piece spindle tower of polymer concrete, reaction resin concrete or the like. Thus, in this case too, the functional surfaces and functional spaces no longer require subsequent cutting machining.

In one or more embodiments of the present disclosure, a vertical slide is mounted on the spindle tower and is linearly displaceable along a vertical axis by way of a ball screw arranged on the spindle tower.

In one or more embodiments of the present disclosure, the ball screw comprises a non-rotating ball screw nut and a rotating ball screw spindle.

In one or more embodiments of the present disclosure, the ball screw spindle is operatively connected to the drive motor via a gear belt stage.

In one or more embodiments of the present disclosure, the vertical slide is guided in a torque-proof and tilt-proof manner by way of two linear roller guides arranged on the spindle tower.

In one or more embodiments of the present disclosure, the two linear roller guides are arranged in one functional plane.

In one or more embodiments of the present disclosure, a horizontal slide which is linearly displaceable along a horizontal axis is arranged on the vertical slide and can be driven by way of an electromechanical lifting cylinder.

In one or more embodiments of the present disclosure, a tool gripper is arranged on the horizontal slide, and has two horizontally linearly displaceable gripping jaws for the machining tool. By way of the gripping jaws, the machining tool can be clamped laterally on the standardised tool receiving cone in the tool gripper.

In one or more embodiments of the present disclosure, the gripper jaws are movable pneumatically, hydraulically or electrically.

In one or more embodiments of the present disclosure, a calliper, by way of which the spatial position of the tool deposition places can be metrologically determined with respect to the tool gripper using a reference measurement surface on the respective tool deposition places, is arranged on the horizontal slide. Thus, teaching of the tool deposition places in relation to the tool gripper can proceed in a simple, automated manner by way of a measurement cycle running in the machine program.

In one or more embodiments of the present disclosure, the spatial position of the tool deposition places can be metrologically determined by evaluating a characteristic force curve resulting from movements of the handling system axes towards defined stop points. Thus, in this way too, teaching of the tool deposition places in relation to the tool gripper can proceed in a simple, automated manner by way of a measurement cycle running in the machine program.

An object of one or more embodiments of the present disclosure is to provide a method for automatically reloading tools between a machine-side pick-up tool magazine store and a tool magazine shelf in an additional magazine, by way of which an optimum tool filling level is provided in the machine-side pick-up tool magazine store.

An object of one or more embodiments of the present disclosure is achieved by a method for automatically reloading tools in a tool magazine shelf according to any one of the preceding claims, in which the tool magazine shelf communicates with a machine-side pick-up tool magazine store in a vertical machining centre via a tool management system implemented in a machine control system of the machining centre, and the machining tools can be reloaded from the tool magazine shelf into the machine-side pick-up tool magazine store or back in a controlled manner by way of a tool handling system in the tool magazine shelf in accordance with a reloading list specified by the machining program currently to be implemented and in accordance with largely space-optimised deposit criteria, in such a way that the tool filling level in the pick-up tool magazine store is filled up in an optimum manner and thus a maximum possible number of machining tools, in some cases of very different geometric dimensions, are located in the machine-side pick-up tool magazine store, and can thus also be changed into the tool spindle of the vertical machining centre from the pick-up tool magazine store relatively promptly.

Within the meaning of one or more of the embodiments of the present disclosure, the "term" tool filling level" refers to the packing density, in the machine-side pick-up tool magazine store, of machining tools to be received.

As a result of the method according to one or more of the embodiments of the present disclosure, a high tool filling level or a high packing density can be achieved when equipping the machine-side pick-up tool magazine store, in particular in connection with the tool magazine shelf according to one or more embodiments of the present disclosure. In this context, the machining tools to be received are sorted or resorted into the machine-side pick-up tool magazine store in accordance with a predictively calculated sorting or resorting scheme. In this context, the tool diameter of the machining tool is the essential main criterion for the sorting. In other words, it is always attempted to determine the mixture of large and small machining tool types when the machining tools are deposited in the machine-side pick-up tool magazine store in such a way that a maximum possible number of machining tools can be deposited. Although the number of tool deposition places in the machine-side pick-up tool magazine store is generally rigidly specified by the constructional configuration, the packing density in the tool magazine store can vary quite considerably. Thus, for example, in the pick-up tool magazine store of the embodiment shown, with even distribution of the deposition places in the pick-up tool magazine store (distribution spacing from tool centre to tool centre always 90 mm), a maximum of 42 tools having a maximum tool diameter of 80 mm can be placed in storage. Since in general tools having a tool diameter greater than 80 mm also have to be placed in storage in the pick-up tool magazine store, in the event of unfavourable deposit sorting it may occur that the two deposition places adjacent to a large tool diameter, for example a machining tool having a tool diameter of 120 mm, can no longer be occupied by a similarly large tool, since the tool having the large tool diameter overlaps the two adjacent deposition places to a greater or lesser extent. Thus, for example, in this embodiment, a machining tool having a tool diameter of 120 mm can at most be deposited adjacent to two machining tools having a tool diameter of 40 mm. This restriction additionally complicates the deposition in the tool magazine store. If the sorting in the tool magazine store is merely based on purely time-optimised, in other words the sorting of the tools strictly corresponds to the order of use in the machining program, this generally does not lead to an optimum tool filling level in the tool magazine store. EP 1 870 200 B1 illustrates and discloses a conventional prior-art method for time-optimised tool sorting. However, a sub-optimal tool filling level in turn has a negative effect on the tool changing time, since in this case it is not possible to exploit the entire tool storage capacity in the pick-up tool magazine close to the machine, and machining tools may have to be produced from a magazine store, and this is time-consuming. Moreover, the advantage of time-optimised sorting only comes fully into effect for relatively slow-moving tool magazine stores. For example, the pick-up magazine store shown in the illustrated embodiment needs less than one second or a 180° rotation, and so in this case time-optimised sorting no longer entails any practical advantage, quite unlike the space-optimised tool sorting or place-optimised tool reloading according to one or more of the embodiments of the present disclosure.

BRIEF DESCRIPTION OF THE DRAWINGS

Further details, features and advantages of the present disclosure may be taken from the following description by way of the drawings.

DETAILED DESCRIPTION

Figure 1:
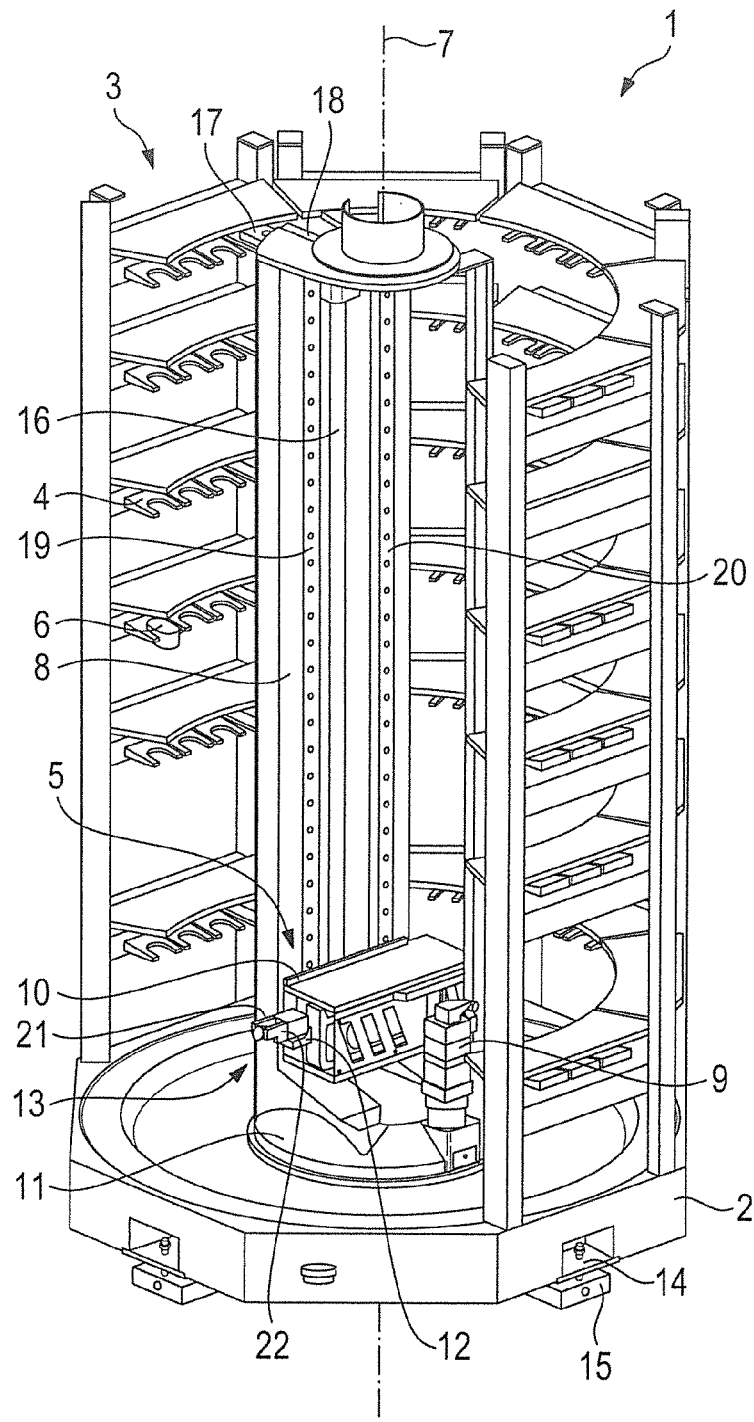
FIG. 1 is a perspective view of an embodiment of a tool magazine shelf according to the present disclosure.
Figure 4:
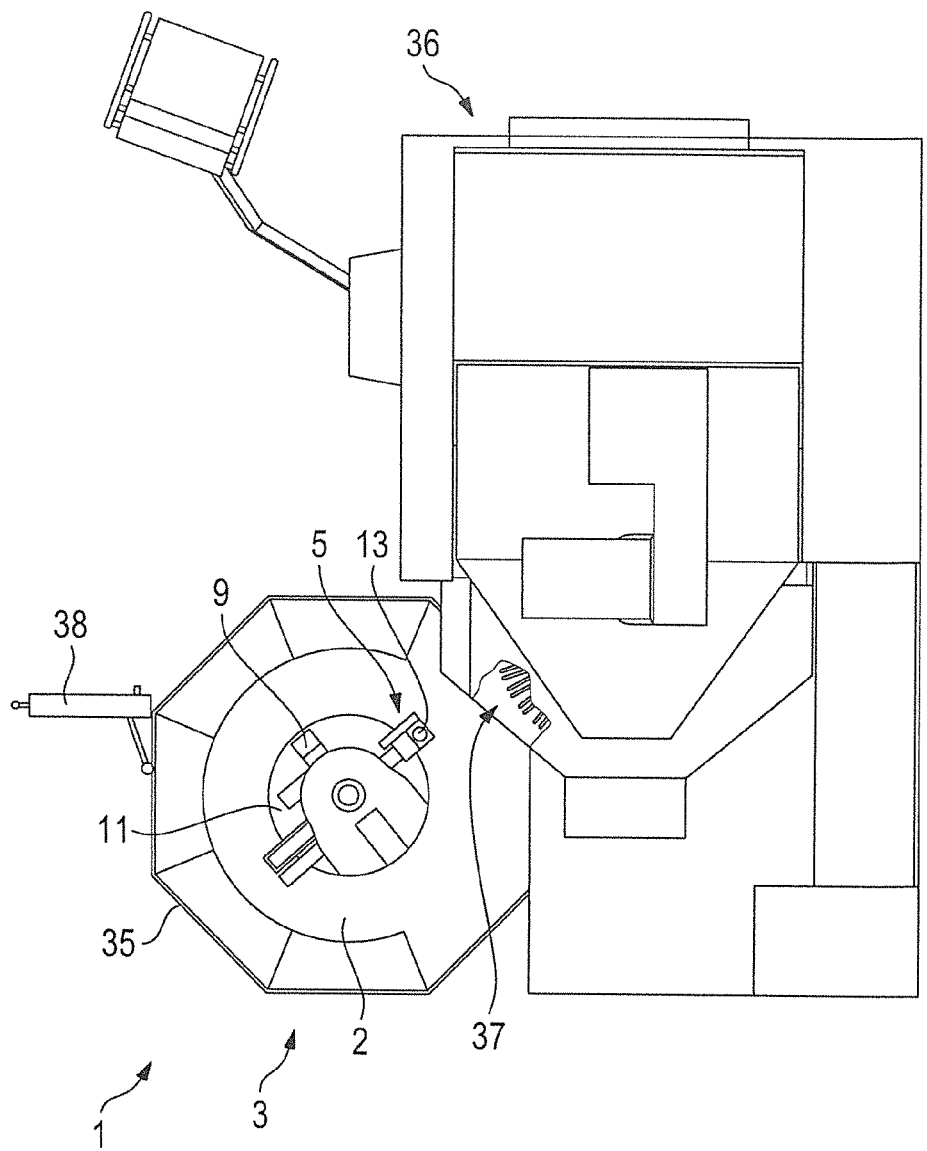
FIG. 4 is a plan view of the tool magazine shelf according to the present disclosure with an embodiment of an attached machining centre according to the present disclosure.

FIGS. 1 and 4 are plan views of a circular, annular tool magazine shelf 1 of a tower construction, of a modular construction and self-sufficient operation, as an additional magazine for a machine-side pick-up tool magazine store 37 arranged in a vertical machining centre.

FIG. 1 is a perspective view of the tool magazine 1. The tool magazine 1 comprises a base frame, which includes a monolithically constructed plate-shaped foundation 2. The foundation 2 serves to receive a tool shelf 3, which in the present case is provided with five shelf fields. The foundation 2 further serves to receive a power-driven tool handling system 5 for transporting tools from the additional magazine 1 to the machine-side pick-up tool magazine store 37 and back and for receiving a protective housing 35 for protecting access to the tool magazine shelf 1.

An operating panel 38 may also be arranged on the protective housing 35.

The tool magazine shelf 1 is provided with a plurality of immovable tool deposit plates, arranged in vertical succession and in a circular ring, for receiving a plurality of identical or different machining tools 6. At the circle centre-point of the tool deposition places 4, there is a pedestal 11 for a vertical rotation shaft 7, which extends upwards overhanging freely from the foundation 2 and carries a spindle tower 8, which can be rotated about the rotation shaft 7 by way of a drive motor 9.

The rotation shaft 7 is mounted in a tower mounting, which is in the form of a one-row or two-row four-point bearing.

A linearly displaceable vertical slide 10 is mounted along a vertical axis on the spindle tower 8, and carries a horizontal slide 12 which is linearly displaceable along a horizontal axis by way of an electromechanical lifting cylinder. Tool grippers 13 for receiving and releasing the machining tools 6 are arranged on the horizontal slide 12.

The foundation 2 is formed by forming all of the functional surfaces and functional spaces from polymer concrete, reaction resin concrete or the like, in such a way that the functional surfaces and functional spaces no longer need subsequent cutting machining.

The spindle tower 8 is likewise formed by forming all of the functional surfaces and functional spaces from polymer concrete, reaction resin concrete or the like, in such a way that the functional surfaces and functional spaces no longer need subsequent cutting machining.

The foundation 2 is mounted on machine feet 14, which are adaptable in height and rest in slip-proof and vibration-proof machine shoes.

The vertical slide 10 which is linearly displaceable along a vertical axis on the spindle tower 8 is displaceable by way of a ball screw arranged on the spindle tower 8. The ball screw comprises a non-rotating ball screw nut and a rotating ball screw spindle 16, which is operatively connected to a drive motor 17 via a gear belt stage 18. The ball screw spindle 16 is mounted in the pedestal 11 via a floating bearing 31 (see FIG. 3). So as to guide the vertical slide 10 in a torque-proof and tilt-proof manner, it is held by way of two linear roller guides 19, 20, which are arranged on the spindle tower 8 and both positioned in the same functional plane (see FIG. 2).

Figure 2:
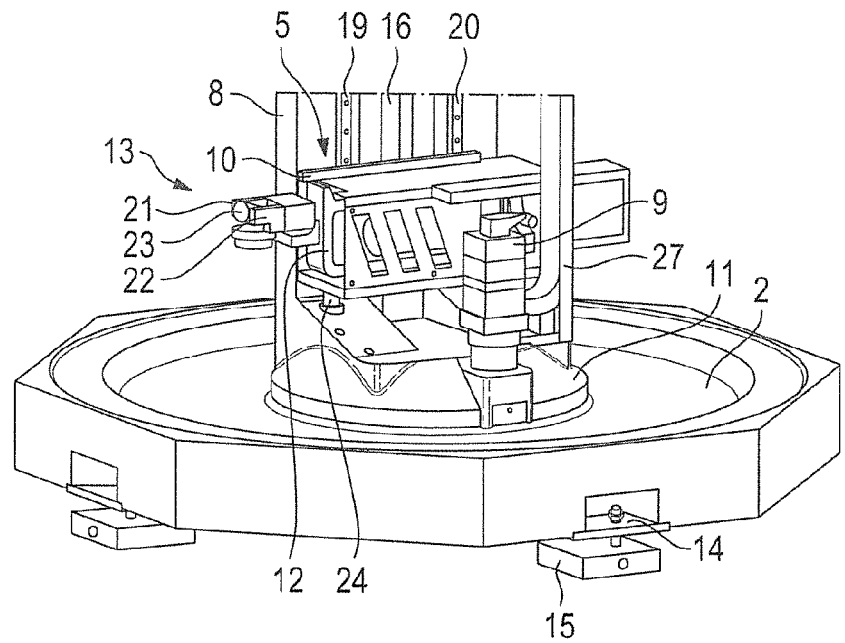
FIG. 2 is a perspective partial view of the tool magazine shelf according to the present disclosure in the region of an embodiment of a base frame according to the present disclosure.

With reference to FIG. 2, the tool gripper 13 has two horizontally linearly displaceable gripping jaws 21, 22, by way of which the machining tool 6 can be clamped laterally on the standardised tool receiving cone 23 in the tool gripper 13. The gripping movement of the gripping jaws 21, 22 may take place pneumatically, hydraulically or electrically.

An end stop 24 is provided on the pedestal 11, and defines the vertical movement of the vertical slide 10.

Figure 3:
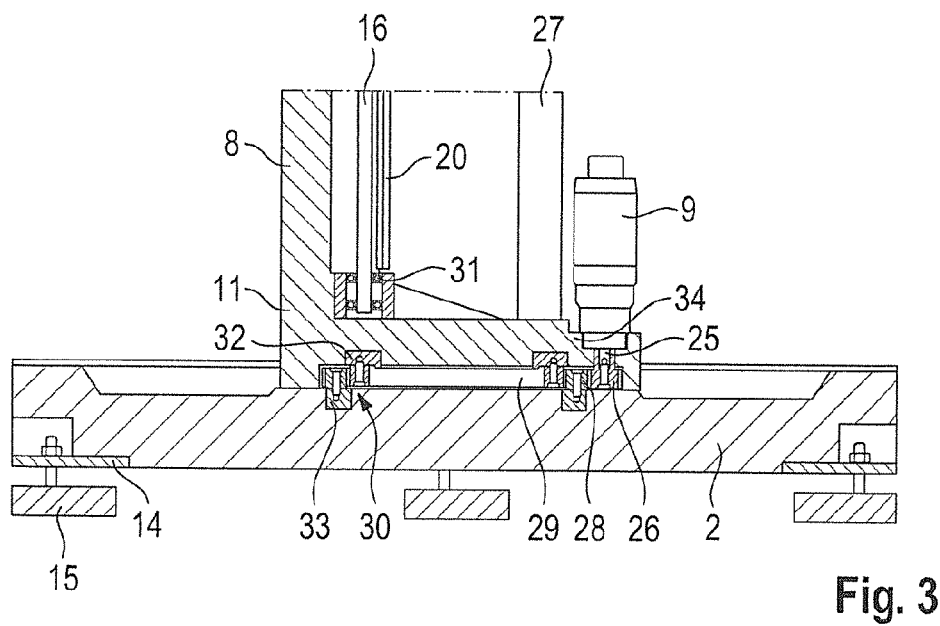
FIG. 3 is a section through the base frame according to the present disclosure.

With reference to FIG. 3, the drive motor 9 for the spindle tower 8, which is rigidly attached to the spindle tower 8 via a flange surface 34, carries a drive pinion 26 on the motor shaft 25 thereof. Further, the four-point bearing which mounts the rotation shaft 7 comprises an outer ring 28, which is provided with external toothing and screwed to the foundation 2, and an inner ring 29, which is screwed to the spindle tower 8. The arrangement is selected in such a way that the drive pinion 26 rolls together with the drive motor 9 on the stationary external toothing 28 of the tower mounting when the spindle tower 8 rotates.

A drag chain guide 27 is provided for supplying energy to the drive motor 9.

The pedestal 11, which forms a cantilever mounting 30 for the spindle tower 8, is braced on the foundation 2 by way of bearing seats 32, 33.

A calliper, by way of which the spatial position of the tool deposition places 4 can be metrologically determined with respect to the tool gripper 13 using a reference measurement surface on the respective tool deposition places 4, is arranged on the horizontal slide 12. Thus, teaching of the tool deposition places 4 in relation to the tool gripper 13 can proceed in a simple, automated manner by way of a measurement cycle running in the machine program.

The spatial position of the tool deposition places 4 can be metrologically determined by evaluating a characteristic force curve resulting from movements of the handling system axes towards defined stop points. Thus, in this way too, teaching of the tool deposition places 4 in relation to the tool gripper 13 can proceed in a simple, automated manner by way of a measurement cycle running in the machine program.

The tool magazine shelf 1 described above may be operated by a method for automatically reloading tools in which the tool magazine shelf 1 communicates with the machine-side pick-up tool magazine store 37 in the machining centre 36 via a tool management system implemented in a machine control system of the vertical machining centre 36, and the machining tools 6 can be reloaded from the tool magazine shelf 1 into the machine-side pick-up tool magazine store 37 or back in a controlled manner by way of a tool handling system 5 in the tool magazine shelf 1 in accordance with a reloading list specified by the machining program currently to be implemented and in accordance with largely space-optimised deposit criteria, in such a way that the tool filling level in the pick-up tool magazine store 37 is filled up in an optimum manner and thus a maximum possible number of machining tools 6, in some cases of very different geometric dimensions, are located in the machine-side pick-up tool magazine store 37, and can thus also be changed into the tool spindle of the vertical machining centre 36 from the pick-up tool magazine store 37 relatively promptly.

One or more embodiments of the present disclosure may relate to a circular, annular tool magazine shelf (1) of a tower construction, comprising a base frame for receiving a tool shelf (3) which has a plurality of immovable tool deposit plates (4), arranged in vertical succession and in a circular ring, for machining tools (6), and receiving a power-driven tool handling system (5) for transporting tools from the tool magazine shelf (1) to a machine-side pick-up tool magazine store (37) and back, a spindle tower (8) which is mounted rotatably about a vertical rotation shaft (7) being arranged in the circle centre-point of the tool deposit plates (4). So as to create a tool magazine shelf which can solve the problems and overcome the drawbacks found in the prior art, one or more embodiments of the present disclosure may provide that the base frame includes a monolithically constructed, plate-shaped foundation (2) in which the rotation shaft (7) is mounted overhanging freely by way of a mounting arrangement.

One or more embodiments of the present disclosure may include one or more of the following concepts:

A. Circular, annular tool magazine shelf (1) of a tower construction, comprising a base frame for receiving
   a tool shelf (3) which has a plurality of immovable tool deposit plates (4), arranged in vertical succession and in a circular ring, for machining tools (6), and receiving
   a power-driven tool handling system (5) for transporting tools from the tool magazine shelf (1) to a machine-side pick-up tool magazine store (37) and back,
   a spindle tower (8) which is mounted rotatably about a vertical rotation shaft (7) being arranged in the circle centre-point of the tool deposit plates (4), characterised in that the base frame includes a monolithically constructed, plate-shaped foundation (2) in which the rotation shaft (7) is mounted overhanging freely by way of a mounting arrangement.

B. Tool magazine shelf according to Paragraph A, characterised in that the mounting arrangement is in the form of a tower mounting.

C. Tool magazine shelf according to Paragraph B, characterised in that the tower mounting is in the form of a one-row or two-row four-point bearing.

D. Tool magazine shelf according to Paragraph C, characterised in that, the four-point bearing comprises an outer ring (28), which is provided with external toothing and screwed to the foundation (2), and an inner ring (29), which is screwed to the spindle tower (8).

E. Tool magazine shelf according to Paragraph D, characterised in that a drive motor (9) comprising a drive pinion (26) is provided for the rotary drive of the spindle tower (8), and is rigidly attached to the spindle tower (8) and operatively connected to the external toothing of the outer ring (28), in such a way that the drive pinion (26) rolls together with the drive motor (9) on the stationary external toothing (28) of the tower mounting when the spindle tower (8) rotates.

F. Tool magazine shelf according to any one of the preceding Paragraphs, characterised in that the foundation (2) is formed by forming all of the functional surfaces and functional spaces in one piece from polymer concrete, reaction resin concrete or the like.

G. Tool magazine shelf according to any one of the preceding Paragraphs, characterised in that the foundation (2) is mounted on machine feet (14), which are adaptable in height and are mounted in slip-proof and vibration-proof machine shoes (15).

H. Tool magazine shelf according to any one of the preceding Paragraphs, characterised in that the spindle tower (8) is formed by forming all of the functional surfaces and functional spaces as a monolithically constructed single-piece spindle tower (8) of polymer concrete, reaction resin concrete or the like.

I. Tool magazine shelf according to any one of the preceding Paragraphs, characterised in that a vertical slide (10) is mounted on the spindle tower (8) and is linearly displaceable along a vertical axis by way of a ball screw arranged on the spindle tower (8).

J. Tool magazine shelf according to Paragraph I, characterised in that the ball screw comprises a non-rotating ball screw nut and a rotating ball screw spindle (16).

K. Tool magazine shelf according to Paragraph J, characterised in that the ball screw spindle (16) is operatively connected to the drive motor (17) via a gear belt stage (18).

L. Tool magazine shelf according to any one Paragraphs I to K, characterised in that the vertical slide (10) is guided in a torque-proof and tilt-proof manner by way of two linear roller guides (19, 20) arranged on the spindle tower (8).

M. Tool magazine shelf according to Paragraph L, characterised in that the two linear roller guides (19, 20) are arranged in one functional plane.

N. Tool magazine shelf according to any one of Paragraphs I to M, characterised in that a horizontal slide (12) which is linearly displaceable along a horizontal axis is arranged on the vertical slide (10) and can be driven by way of an electromechanical lifting cylinder.

O. Tool magazine shelf according to Paragraph N, characterised in that a tool gripper (13) is arranged on the horizontal slide (12), and has two horizontally linearly displaceable gripping jaws (21, 22) for the machining tool (6).

P. Tool magazine shelf according to Paragraph O, characterised in that the gripper jaws (21, 22) are movable pneumatically, hydraulically or electrically.

Q. Tool magazine shelf according to any one of Paragraphs N to P, characterised in that a calliper, by means of which the spatial position of the tool deposition places (4) can be metrologically determined with respect to the tool gripper (13) using a reference measurement surface on the respective tool deposition places (4), is arranged on the horizontal slide (12).

R. Tool magazine shelf according to any one Paragraphs A to P, characterised in that the spatial position of the tool deposition places (4) can be metrologically determined by evaluating a characteristic force curve resulting from movements of the handling system axes towards defined stop points.

S. Method for automatically reloading tools in a tool magazine shelf (1) according to any one of the preceding claims, in which the tool magazine shelf (1) communicates with a machine-side pick-up tool magazine store (37) in a vertical machining centre (36) via a tool management system implemented in a machine control system of the machining centre (36), and the machining tools (6) can be reloaded from the tool magazine shelf (1) into the machine-side pick-up tool magazine store (37) or back in a controlled manner by means of a tool handling system (5) in the tool magazine shelf (1) in accordance with a reloading list specified by the machining program currently to be implemented and in accordance with largely space-optimised deposit criteria, in such a way that the tool filling level in the pick-up tool magazine store (37) is filled up in an optimum manner and thus a maximum possible number of machining tools (6), in some cases of very different geometric dimensions, are located in the machine-side pick-up tool magazine store (37), and can thus also be changed into the tool spindle of the vertical machining centre (36) from the pick-up tool magazine store (37) relatively promptly.

One or more embodiments of the present disclosure may include one or more of the following features, which correspond to reference numerals in the drawings:

1 Tool magazine shelf
2 Foundation
3 Tool shelf
4 Tool deposition places
5 Tool handling system
6 Machining tools
7 Rotation shaft
8 Spindle tower
9 Drive motor
10 Vertical slide
11 Pedestal
12 Horizontal slide
13 Tool gripper
14 Machine foot
15 Machine shoe
16 Ball screw spindle
17 Drive motor
18 Gear belt stage
19 Linear roller guide
20 Linear roller guide
21 Gripping jaw
22 Gripping jaw
23 Tool receiving cone
24 End stop
25 Motor shaft
26 Drive pinion
27 Drag chain guide
28 Outer ring
29 Inner ring
30 Cantilever mounting
31 Floating bearing
32 Bearing seat
33 Bearing seat
34 Flange surface
35 Protective housing
36 Machining centre
37 Pick-up tool magazine store
38 Operating panel The above description of the present invention is merely for illustrative purposes, and does not serve to limit the invention. Various changes and modifications are possible within the context of the invention, without departing from the scope of the invention and of the equivalent thereof.

What is claimed is:

1. A circular, annular tool magazine shelf of a tower construction, comprising:
   a base frame adapted for receiving
      a tool shelf which has a plurality of immovable tool deposit plates, arranged in vertical succession and in a circular ring, adapted for storing one or more machining tools, and
      a power-driven tool handling system adapted for transporting the one or more machining tools between the tool shelf and a machine-side pick-up tool magazine store;
   a spindle tower to which the power-driven tool handling system is attached, wherein the spindle tower is mounted rotatably about a vertical rotation shaft that is arranged at a center-point of the circular ring, wherein the base frame includes a monolithically constructed, plate-shaped foundation in which the vertical rotation shaft is mounted by way of a mounting arrangement, wherein the mounting arrangement includes a non-rotatable outer ring, which is provided with external toothing and is fixedly attached to the foundation, and an inner ring, which is fixedly attached to the spindle tower, and a first drive motor having a drive pinion for driving rotation of the spindle tower, and the first drive motor is rigidly attached to the spindle tower and operatively connected to the external toothing of the outer ring in such a way that when the spindle tower rotates, the drive pinion rolls together with the drive motor on the external toothing of the outer ring.

2. The tool magazine shelf of claim 1, wherein the mounting arrangement is in the form of a tower mounting.

3. The tool magazine shelf of claim 2, wherein the tower mounting is in the form of a one-row four-point bearing or a two-row four-point bearing.

4. The tool magazine shelf of claim 3, wherein the one-row four-point bearing or the two-row four-point bearing includes the outer ring.

5. The tool magazine shelf of claim 1, wherein the foundation is formed by forming all functional surfaces and functional spaces of the foundation in one piece from polymer concrete, or reaction resin concrete.

6. The tool magazine shelf of claim 1, wherein the foundation is mounted on one or more machine feet, which each are adaptable in height and are mounted in respective slip-proof and vibration-proof machine shoes.

7. The tool magazine shelf of claim 1, wherein the spindle tower is formed by forming all functional surfaces and functional spaces of the spindle tower in a monolithically constructed single-piece from polymer concrete, or reaction resin concrete.

8. The tool magazine shelf of claim 1, wherein a vertical slide is mounted on the spindle tower and is linearly displaceable along a vertical axis by way of a ball screw arranged on the spindle tower.

9. The tool magazine shelf of claim 8, wherein the ball screw comprises a non-rotating ball screw nut and a rotating ball screw spindle.

10. The tool magazine shelf of claim 9, wherein the ball screw spindle is operatively connected to a second drive motor via a gear belt stage.

11. The tool magazine shelf of claim 10, wherein the vertical slide is guided in a torque-proof and tilt-proof manner by a plurality of linear guides arranged on the spindle tower.

12. The tool magazine shelf of claim 11, wherein the plurality of linear guides comprises two linear guides, which are arranged in one functional plane.

13. The tool magazine shelf of claim 12, wherein a horizontal slide, which is linearly displaceable along a horizontal axis, is arranged on the vertical slide and can be driven by way of an electromechanical lifting cylinder.

14. The tool magazine shelf of claim 13, wherein a tool gripper is arranged on the horizontal slide, and has two horizontally linearly displaceable gripping jaws adapted for gripping the one or more machining tools.

15. The tool magazine shelf of claim 14, wherein the gripper jaws are movable pneumatically, hydraulically or electrically.

16. The tool magazine shelf of claim 15, wherein a caliper, with which a spatial position of one or more tool deposition places on the tool deposit plates can be metrologically determined with respect to the tool gripper using a reference measurement surface on the respective tool deposition places, is arranged on the horizontal slide.

17. The tool magazine shelf of claim 15, wherein a spatial position of one or more tool deposition places on the tool deposit plates can be metrologically determined by evaluating a characteristic force curve resulting from movements of handling system axes towards defined stop points.

18. A method for automatically reloading the one or more machining tools in the tool magazine shelf according to claim 1, the method comprising:

the tool magazine shelf communicates with the machine-side pick-up tool magazine store in a vertical machining center via a tool management system implemented in a machine control system of the machining center, and the one or more machining tools can be reloaded from the tool magazine shelf into the machine-side pick-up tool magazine store or back in a controlled manner by a tool handling system in the tool magazine shelf in accordance with a reloading list specified by a machining program currently implemented and in accordance with space-optimized deposit criteria, in such a way that a tool filling level in the pickup tool magazine store is filled up in an optimum manner and thus a maximum possible number of the one or more machining tools are located in the machine-side pick-up tool magazine store, and can thus also be changed into a tool spindle of the vertical machining center from the pick-up tool magazine store.

\* \* \* \* \*